US009023141B2

(12) United States Patent
Silver et al.

(10) Patent No.: US 9,023,141 B2
(45) Date of Patent: May 5, 2015

(54) METHOD OF PREPARING AQUEOUS PIGMENT DISPERSIONS

(71) Applicant: E I du Pont de Nemours and Company, Wilmington, DE (US)

(72) Inventors: James A. Silver, Kennett Square, PA (US); C. Chad Roberts, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 261 days.

(21) Appl. No.: 13/626,926

(22) Filed: Sep. 26, 2012

(65) Prior Publication Data

US 2013/0081553 A1 Apr. 4, 2013

Related U.S. Application Data

(60) Provisional application No. 61/540,647, filed on Sep. 29, 2011.

(51) Int. Cl.

| | |
|---|---|
| ***C09D 11/02*** | (2014.01) |
| ***C08K 5/00*** | (2006.01) |
| ***C09D 17/00*** | (2006.01) |
| ***C09D 11/322*** | (2014.01) |

(52) U.S. Cl.
CPC ............ *C09D 17/001* (2013.01); *C09D 11/322* (2013.01)

(58) Field of Classification Search
USPC ................................................ 106/505, 31.6
See application file for complete search history.

(56) References Cited

U.S. PATENT DOCUMENTS

| | | | |
|---|---|---|---|
| 2,439,442 | A | 4/1948 | Amon et al. |
| 5,085,698 | A | 2/1992 | Ma et al. |
| 6,120,594 | A | 9/2000 | Curtis et al. |
| 6,852,156 | B2 | 2/2005 | Yeh et al. |

OTHER PUBLICATIONS

Inoue et. al., High Pressure Synthesis and Properties of Aliphatic-Aromatic Polyimides via Nylon-Salt-Type Monomers . . . , Macromolecules (1997), 30(7), 1921-1928.

*Primary Examiner* — Veronica F Faison

(74) *Attorney, Agent, or Firm* — John H. Lamming; Simon L. Xu

(57) ABSTRACT

A process for preparing an aqueous pigment dispersion is provided in which a pigment, a coating agent, a grinding agent and a vehicle are subjected to grinding, followed by removal of the grinding agent and the vehicle to form a press cake, and dispersing the press cake to form a pigment dispersion. Also disclosed is an ink-jet ink containing an aqueous vehicle and the aqueous pigment dispersion thus made.

20 Claims, No Drawings

METHOD OF PREPARING AQUEOUS PIGMENT DISPERSIONS

CROSS REFERENCE TO RELATED APPLICATIONS

This application claims priority under 35 U.S.C. §119 from U.S. Provisional Application Ser. Nos. 61/540,647 and 61/540,658, filed Sep. 29, 2011, both of which are incorporated by reference in their entirety.

BACKGROUND OF THE DISCLOSURE

This disclosure pertains to a process of making aqueous pigment dispersions. These dispersions may be used in the preparation of aqueous ink-jet inks, pigmented paints, and the like. More particularly, this disclosure relates to a process of making aqueous pigment dispersions by coating the pigments with coating agents using a grinding process.

Aqueous dispersions of pigments are widely used in ink-jet printing. Because a pigment is typically not soluble in an aqueous vehicle, it is often required to use a dispersing agent, such as a polymeric dispersant or a surfactant, to produce a stable dispersion of the pigment in the aqueous vehicle.

The use of dispersing agents, however, increases the viscosity of the dispersion over what it would be without the dispersing agents. Certain end use applications of the dispersion, such as ink-jet ink, may have limitations on viscosity, thus having dispersing agents in a dispersion may reduce the formulation latitude of the dispersion for final products.

The use of self-dispersing pigment has been known in the art for many years. U.S. Pat. No. 2,439,442 discloses a process in which a carbon black pigment is exothermically reacted with a water solution of sodium hypochlorite, or is subjected to electrolysis in a sodium chloride solution, or is suspended in a sodium hydroxide solution and treated with chlorine gas to alter the colloidal properties such that the carbon black will readily and spontaneously disperse in water. U.S. Pat. No. 6,852,156 discloses a process of oxidizing carbon black using ozone under a dispersive environment. U.S. Pat. No. 6,120,594 discloses the oxidation of carbon black with hydrogen peroxide.

While there are many approaches focusing on modifying the pigment surface by chemical reactions leading to hydrophilic moieties covalently attached to the pigment surface, organic color pigments such as quinacridone magenta, cyan and yellow are inherently difficult to treat and functionalize by chemical processing to produce a pigment that is readily dispersible in an aqueous vehicle.

A need exists for an effective, easy-to-operate, and lower cost process for making stable pigment dispersions containing organic color pigments as colorant. The present disclosure satisfies this need by providing a process for making a pigment dispersion by using a coating process to introduce a coating agent with functionality to the pigment surface and thus impart the functionality of the coating agent to the pigment surface. Proper selection of coating agents having dispersing moieties results in the coated pigment being dispersible in an aqueous vehicle without the aid of a dispersant.

SUMMARY OF THE DISCLOSURE

An embodiment of the present disclosure provides a process for making an aqueous pigment dispersion comprising the steps of:

(a) grinding a mixture comprising a pigment, one or a combination of coating agents, a grinding agent and a vehicle, wherein said grinding agent is insoluble in said vehicle and soluble in water, and said coating agents contain an ionizable moiety and have a structure of formula (I):

$$Q\text{-}[M^1]_n \quad (I);$$

(b) washing with an aqueous medium to remove said grinding agent to form a press cake; and (c) adding an aqueous vehicle, adjusting the pH to ionize said ionizable moiety on said coating agents, and dispersing said press cake from step (b), in this order or any other workable orders, to form a dispersion;

wherein each $M^1$ is COOH or $NR^1R^2$, or two $M^1$ groups can be taken together with the carbon atoms they are bonded to form a cyclic anhydride, or $M^1$ is OH when Q is $C_6$-$C_{40}$ aryl; n is an integer from 2 to 6; each $R^1$ and $R^2$ is independently H, $C_1$-$C_9$ alkyl or $C_3$-$C_{12}$ cycloalkyl; and Q is $C_6$-$C_{40}$ alkyl, $C_6$-$C_{40}$ substituted alkyl, $C_6$-$C_{40}$ aryl or Q is —$Ar^1$—Y—$Ar^2$— and forms a molecule of formula (II):

$$[M^2]_m\text{—}Ar^1\text{—}Y\text{—}Ar^2\text{—}[M^2]_m; \quad (II)$$

wherein $Ar^1$ and $Ar^2$ are independently $C_6$-$C_{40}$ aryl; Y is $CR^3R^4$, S, S(O) or a straight bond; $R^3$ and $R^4$ are independently H or $C_1$-$C_9$ alkyl; each $M^2$ is COOH, or two $M^2$ groups can be taken together with the carbon atoms they are bonded to form a cyclic anhydride; and each m is independently an integer from 2 to 4.

Another embodiment provides that the process further comprising a ultrafiltration step after step (c).

Another embodiment provides that the grinding agent is an inorganic salt.

Another embodiment provides that grinding takes place at temperature greater than 85° C.

Another embodiment provides that grinding initially takes place at temperature greater than 85° C. and subsequently at temperature greater than 135° C.

Another embodiment provides that grinding initially takes place at temperature greater than 160° C. and subsequently at temperature greater than 85° C.

Another embodiment provides that the aqueous medium in step (b) has a conductivity of less than 100 micro-Siemens per centimeter.

Another embodiment provides that $M^1$ is COOH and a base is used to adjust the pH.

Another embodiment provides that $M^1$ is $NR^1R^2$ and an acid is used to adjust the pH.

Another embodiment provides that two $M^1$ groups are taken together with the carbon atoms they are bonded to form a cyclic anhydride.

Another embodiment provides that Q is $C_6$-$C_{40}$ aryl.

Another embodiment provides that the n is 4.

Another embodiment provides that the Q is —$Ar^1$—Y—$Ar^2$—.

Another embodiment provides that $Ar^1$ and $Ar^2$ are phenyl.

Another embodiment provides that Y is a straight bond.

Another embodiment provides that each m is 2.

Another embodiment provides a process for making a readily dispersible press cake comprising the steps of:

(a) grinding a mixture comprising a pigment, one or a combination of coating agents, a grinding agent and a vehicle, wherein said grinding agent is insoluble in said vehicle and soluble in water, and said coating agents contain an ionizable moiety and have a structure of formula (I):

$$Q+M^1]_n \quad (I);$$

and (b) washing with an aqueous medium to remove said grinding agent to form a press cake;

wherein each $M^1$ is COOH or $NR^1R^2$, or two $M^1$ groups can be taken together with the carbon atoms they are bonded to form a cyclic anhydride, or $M^1$ is OH when Q is $C_6$-$C_{40}$ aryl; n is an integer from 2 to 6; each $R^1$ and $R^2$ is independently H, $C_1$-$C_9$ alkyl or $C_3$-$C_{12}$ cycloalkyl; and Q is $C_6$-$C_{40}$ alkyl, $C_6$-$C_{40}$ substituted alkyl, $C_6$-$C_{40}$ aryl or Q is —$Ar^1$—Y—$Ar^2$— and forms a molecule of formula (II):

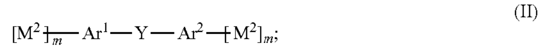

(II)

wherein $Ar^1$ and $Ar^2$ are independently $C_6$-$C_{40}$ aryl; Y is $CR^3R^4$, S, S(O) or a straight bond; $R^3$ and $R^4$ are independently h or $C_1$-$C_9$ alkyl; each $M^2$ is COOH, or two $M^2$ groups can be taken together with the carbon atoms they are bonded to form a cyclic anhydride; and each m is independently an integer from 2 to 4.

Yet another embodiment provides an ink-jet ink comprising an aqueous ink-jet vehicle and an aqueous pigment dispersion, wherein said aqueous pigment dispersion is prepared by a process comprising the steps of:

(a) grinding a mixture comprising a pigment, one or a combination of coating agents, a grinding agent and a vehicle, wherein said grinding agent is insoluble in said vehicle and soluble in water, and said coating agents contain an ionizable moiety and have a structure of formula (I):

$$Q+M^1]_n \quad (I);$$

(b) washing with an aqueous medium to remove said grinding agent to form a press cake; and (c) adding an aqueous vehicle, adjusting the pH to ionize said ionizable moiety on said coating agents, and dispersing said press cake from step (b), in this order or any other workable orders, to form a dispersion;

wherein each $M^1$ is COOH or $NR^1R^2$, or two $M^1$ groups can be taken together with the carbon atoms they are bonded to form a cyclic anhydride, or $M^1$ is OH when Q is $C_6$-$C_{40}$ aryl; n is an integer from 2 to 6; each $R^1$ and $R^2$ is independently H, $C_1$-$C_9$ alkyl or $C_3$-$C_{12}$ cycloalkyl; and Q is $C_6$-$C_{40}$ alkyl, $C_6$-$C_{40}$ substituted alkyl, $C_6$-$C_{40}$ aryl or Q is —$Ar^1$—Y—$Ar^2$— and forms a molecule of formula (II):

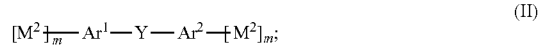

(II)

wherein $Ar^1$ and $Ar^2$ are independently $C_6$-$C_{40}$ aryl; Y is $CR^3R^4$, S, S(O) or a straight bond; $R^3$ and $R^4$ are independently H or $C_1$-$C_9$ alkyl; each $M^2$ is COOH, or two $M^2$ groups can be taken together with the carbon atoms they are bonded to form a cyclic anhydride; and each m is independently an integer from 2 to 4.

These and other features and advantages of the present embodiments will be more readily understood by those of ordinary skill in the art from a reading of the following Detailed Description. Certain features of the disclosed embodiments which are, for clarity, described above and below as a separate embodiment, may also be provided in combination in a single embodiment. Conversely, various features of the disclosed embodiments that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this disclosure pertains.

Unless stated otherwise, all percentages, g, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

As used herein, the term "dispersion" means a two phase system where one phase consists of finely divided particles (often in the colloidal size range) distributed throughout a bulk substance, of the particles being the dispersed or internal phase and the bulk substance being the continuous or external phase.

As used herein, the term "aqueous vehicle" refers to water or a mixture of water and at least one water-soluble, or partially water-soluble (i.e. methyl ethyl ketone), organic solvent (co-solvent).

As used herein, the term "ionizable moiety" means a moiety containing potentially ionic group(s).

As used herein, the term "Mw" means weight average molecular weight.

As used herein, the term "Mn" means number average molecular weight.

As used herein, the term "D50" means the volume particle diameter of the 50th percentile (median) of the distribution of particle sizes.

As used herein, the term 'D95' means the volume particle diameter of the 95th percentile of the distribution of particle sizes.

As used herein, the term "cPs" means centipoise, a viscosity unit.

As used herein, the term "mrN.m−1" means milli Newtons per meter, a surface tension unit.

As used herein, the term "dyne/cm" means dyne per centimeter, a surface tension unit.

As used herein, the term "µS/cm" means micro-Siemens per centimeter, a conductivity unit.

As used herein, the term "mPa.s" means millipascal second, a viscosity unit.

As used herein, the term "AN" means acid number, mg KOH/g of pigment.

As used herein, the term "Sulfolane" means tetramethylene sulfone.

As used herein, Glycereth 26 is the polyethylene glycol ether of Glycerin with an average ethoxylation value of 26.

As used herein, the term "EDTA" means ethylenediaminetetraacetic acid.

As used herein, the term "IDA" means iminodiacetic acid.

As used herein, the term "EDDHA" means ethylenediamine-di(o-hydroxyphenylacetic acid).

As used herein, the term "NTA" means nitrilotriacetic acid.

As used herein, the term "DHEG" means dihydroxyethylglycine.

As used herein, the term "CyDTA" means trans-1,2-cyclohexanediaminetetraacetic acid.

As used herein, the term "DTPA" means diethylenetriamine-N,N,N',N",N"-pentaacetic acid.

As used herein, the term "GEDTA" means glycoletherdiamine-N,N,N',N'-tetraacetic acid.

As Unless otherwise noted, the above chemicals were obtained from Aldrich (Milwaukee, Wis.) or other similar suppliers of laboratory chemicals.

In addition, references in the singular may also include the plural (for example, "a" and "an" may refer to one, or one or more) unless the context specifically states otherwise In one embodiment, the present disclosure provides a process for making an aqueous pigment dispersion comprising the steps of:

(a) grinding a mixture comprising a pigment, one or a combination of coating agents, a grinding agent and a vehicle, wherein said grinding agent is insoluble in said vehicle and soluble in water, and said coating agents contain an ionizable moiety and have a structure of formula (I):

$$Q\text{-}[M^1]_n \quad (I);$$

(b) washing with an aqueous medium to remove said grinding agent to form a press cake; and (c) adding an aqueous vehicle, adjusting the pH to ionize said ionizable moiety on said coating agents, and dispersing said press cake from step (b), in this order or any other workable orders, to form a dispersion;

wherein each $M^1$ is COOH or $NR^1R^2$, or two $M^1$ groups can be taken together with the carbon atoms they are bonded to form a cyclic anhydride, or $M^1$ is OH when Q is $C_6$-$C_{40}$ aryl; n is an integer from 2 to 6; each $R^1$ and $R^2$ is independently H, $C_1$-$C_9$ alkyl or $C_3$-$C_{12}$ cycloalkyl; and Q is $C_6$-$C_{40}$ alkyl, $C_6$-$C_{40}$ substituted alkyl, $C_6$-$C_{40}$ aryl or Q is —$Ar^1$—Y—$Ar^2$— and forms a molecule of formula (II):

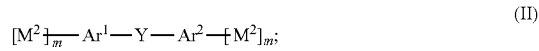

$$[M^2]_m\text{—}Ar^1\text{—}Y\text{—}Ar^2\text{—}[M^2]_m; \quad (II)$$

wherein $Ar^1$ and $Ar^2$ are independently $C_6$-$C_{40}$ aryl; Y is $CR^3R^4$, S, S(O) or a straight bond; $R^3$ and $R^4$ are independently h or $C_1$-$C_9$ alkyl; each $M^2$ is COOH, or two $M^2$ groups can be taken together with the carbon atoms they are bonded to form a cyclic anhydride; and each m is independently an integer from 2 to 4.

In step (a), a pigment, one or a combination of coating agents, a grinding agent, and a vehicle are mechanically ground or kneaded together. The vehicle is typically an organic solvent soluble in water. Suitable organic solvents include, but are not limited to, $C_2$-$C_6$ diols such as ethylene glycol, propylene glycol, glycerin, triethylene glycol, diethylene glycol and dipropylene glycol; $C_1$-$C_8$ alcohols such as methanol, ethanol and propanol; amides such as formamide, dimethylformamide and N-methylpyrrolidone; and sulfoxides such as sulfolane and dimethyl sulfoxide. The grinding agent is insoluble in the vehicle and soluble in water. "Insoluble" means having a solubility of less than 0.005 g of a solute, e.g., the grinding agent, in 1 liter of solvent, e.g., the vehicle, at 25° C. "Soluble" means having a solubility greater than or equal to 0.005 g of a solute, e.g., the grinding agent, in 1 liter of solvent, e.g., water. Typical grinding agents are granular inorganic salts of proper sizes, such as micronized sodium chloride, potassium chloride, sodium sulphate, calcium chloride, aluminum chloride, zinc chloride and ferric chloride. Typically, the weight ratio of the grinding agent to pigment is from 3:1 to 20:1. More typically, the weight ratio of the grinding agent to pigment is from 6:1 to 10:1. The coating agent(s) contain an ionizable moiety and have a structure of formula (I):

$$Q\text{-}[M^1]_n \quad (I);$$

wherein n, $M^1$, and Q are as defined above, Q can also be —$Ar^1$—Y—$Ar^2$— and forms a molecule of formula (II):

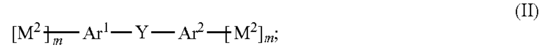

$$[M^2]_m\text{—}Ar^1\text{—}Y\text{—}Ar^2\text{—}[M^2]_m; \quad (II)$$

wherein m, $M^2$, $Ar^1$, $Ar^2$, and Y are as defined above. Coating agent(s) of formula (I) or formula (II) are either commercially available or can be readily prepared by one of ordinary skill in organic chemistry.

Grinding is generally conducted in a stainless horizontal mixing vessel. Often grinding initially takes place at one temperature and continues to completion while the temperature is increased or decreased to facilitate mixing. Typically, grinding takes place at temperatures greater than 85° C. More typically grinding takes place initially at temperature greater than 85° C., and subsequently at temperatures greater than 135° C. Alternatively, grinding takes place initially at temperature greater than 160° C., and subsequently at temperatures greater than 85° C. Depending the heating apparatus utilized, the temperature of the heating element or jacket may be higher than the internal temperature of the mixture. Adequate grinding is usually achieved after grinding under the conditions described above for a period of from 30 minutes to 24 h.

The coating agents in step (a) are as described above. The weight ratio of the coating agent to the pigment is typically from 1:1000 to 1:5; more typically from 1:50 to 1:20. One of ordinary skill in the art can readily determine the amounts of the grinding agents and the vehicle to be used based on the particular paring of pigment and coating agent(s) to form a mixture with suitable thickness for grinding.

During step (a), the grinding or kneading causes the coating agent to be adhered to the pigment surface. The coating agent is not chemically bonded to the pigment, but instead is physically entrapped onto the pigment surface. Thus the properties of the pigment surface is altered by the coating agent(s) that are adhered to the pigment surface. Consequently, a coating agent having dispersing moieties results in the coated pigment being dispersible in an aqueous vehicle without the aid of a dispersant.

In step (b), the product of step (a) is washed with an aqueous medium to remove the grinding agent and the vehicle. The aqueous medium is typically water or a mixture of water with organic solvents such as methanol, ethanol or other $C_3$-$C_4$ alcohols. Adequate agitation is generally required to dissolve the grinding agent. Often it is necessary to adjust the pH to ionize the grinding agent to ease its removal. Typically, warm water is employed or heat is applied to facilitate this process. The mixture is separated by a filtration, followed by additional washing, to give a press cake of a treated pigment. The washing is usually monitored by measuring the conductivity of the filtrate. When the conductivity of the filtrate drops below 250 μS/cm, washing is deemed adequate.

In step (c), the press cake from step (b) is dispersed to form a dispersion. This is done by adding an aqueous vehicle, adjusting the pH to ionize the ionizable moiety on the coating agents and dispersing the press cake, in this order or any other workable orders. A high-speed disperser (HSD) is particularly suitable for this step. A high shear fluid processer, operated at from 500 rpm to 4000 rpm, and more typically from 2000 rpm to 3500 rpm, provides optimal shear to achieve the desired dispersing. Typically the dispersing is conducted under a pressure of up to 15,000 psi in a pass-to-pass mode for between 1 and 20 passes.

Optionally, the dispersion is further purified by an ultrafiltration step after step (c). The ultrafiltration can be carried out on any conventional cross-flow, hollow fiber membrane. Typically, the membrane has a fiber with inner diameter greater than 0.75 mm, more typically greater than 1 mm. Suitable commercially available materials for constructing the membrane include polyethylene, polypropylene, polysulfone, polyvinylidene fluoride, and ceramic.

Colorants

A wide variety of organic and inorganic pigments, alone or in combination, may be dispersed with the dispersant polymer to prepare an ink, especially an ink-jet ink. The term "pigment" as used herein means an insoluble colorant that is required to be dispersed with a dispersant and processed under dispersive conditions in the presence of a dispersant. The colorant also includes dispersed dyes. The dispersion process results in a stable dispersed pigment. The pigment used with the inventive dispersant polymer does not include self-dispersed pigments. The pigment particles are sufficiently small to permit free flow of the ink through the ink-jet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Typically, the pigment particle size should range from about 0.005 to about 5 micron and, most typically, from about 0.005 to about 1 micron. The average particle size as measured by dynamic light scattering is less than about 500 nm, typically less than about 300 nm.

The selected pigment(s) may be used in dry or wet form. For example, pigments are usually manufactured in aqueous media, and the resulting pigments are obtained as a water-wet press cake. In press cake form, the pigment does not agglomerate to the extent as in dry form. Thus, pigments in water-wet press cake form do not require as much mixing energy to de-agglomerate in the premix process as pigments in dry form. Representative commercial dry pigments are listed in U.S. Pat. No. 5,085,698.

Some examples of pigments with coloristic properties useful in inkjet inks include: cyan pigments from Pigment Blue 15:3 and Pigment Blue 15:4; magenta pigments from Pigment Red 122 and Pigment Red 202; yellow pigments from Pigment Yellow 14, Pigment Yellow 95, Pigment Yellow 110, Pigment Yellow 114, Pigment Yellow 128 and Pigment Yellow 155; red pigments from Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255, Pigment Red 264 and Pigment Red 269; green pigments from Pigment Green 1, Pigment Green 2, Pigment Green 7 and Pigment Green 36; blue pigments from Pigment Blue 60, Pigment Violet 3, Pigment Violet 19, Pigment Violet 23, Pigment Violet 32, Pigment Violet 36 and Pigment Violet 38; white pigments such as $TiO_2$ and ZnO; and black pigment carbon black. The pigment names and abbreviations used herein are the "C.I." designation for pigments established by Society of Dyers and Colourists, Bradford, Yorkshire, UK and published in The Color Index, Third Edition, 1971.

In the case of organic pigments, the ink may contain up to approximately 30%, typically from 0.1% to about 25%, and more specifically from 0.25% to 10% of pigment, by weight based on the total ink weight. If an inorganic pigment is selected, the ink will tend to contain higher percentages by weight of pigment than with comparable inks employing organic pigment, since inorganic pigments generally have higher densities than organic pigments.

Ink Vehicle

The pigmented ink of this disclosure comprises an ink vehicle, typically an aqueous ink-jet vehicle, also known as an aqueous carrier medium or aqueous vehicle.

The ink vehicle is the liquid carrier (or medium) for the aqueous dispersion(s) and optional additives. The term "aqueous ink vehicle" refers to an ink vehicle comprised of water or a mixture of water and one or more organic, water-soluble vehicle components commonly referred to as co-solvents or humectants. Selection of a suitable mixture depends on requirements of the specific application, such as desired surface tension and viscosity, the selected pigment, drying time of the pigmented ink jet ink, and the type of paper onto which the ink will be printed. Sometimes in the art, when a co-solvent can assist in the penetration and drying of an ink on a printed substrate, it is referred to as a penetrant.

Examples of water-soluble organic solvents and humectants include: alcohols, ketones, keto-alcohols, ethers and others, such as thiodiglycol, Sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

A mixture of water and a polyhydric alcohol, such as diethylene glycol, is typical as the aqueous ink vehicle. In the case of a mixture of water and diethylene glycol, the ink vehicle usually contains from 30% water and 70% diethylene glycol to 95% water and 5% diethylene glycol, more typically from 60% water and 40% diethylene glycol to 95% water and 5% diethylene glycol. Percentages are based on the total weight of the ink vehicle. A mixture of water and butyl carbitol is also an effective ink vehicle.

The amount of ink vehicle in the ink is typically in the range of from 70% to 99.8%, and more typically from 80% to 99.8%, by weight based on total weight of the ink.

The ink vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. Typical 1,2-alkanediols are $C_4$-$C_6$ alkanediols with 1,2-hexanediol being most typical. Suitable surfactants include ethoxylated acetylene diols (e.g. Surfynol® series commercially available from Air Products), ethoxylated alkyl primary alcohols (e.g. Neodol® series commercially available from Shell) and secondary alcohols (e.g. Tergitol® series commercially available from Union Carbide), sulfosuccinates (e.g. Aerosol® series commercially available from Cytec), organosilicones (e.g. Silwet® series commercially available from Witco) and fluoro surfactants (e.g. Zonyl® series commercially available from DuPont).

The amount of glycol ether(s) and 1,2-alkanediol(s) added is typically in the range of from 1% to 15%, and more typically from 2% to 10% by weight, based on the total weight of the ink. Surfactants may be used, typically in the amount of from 0.01% to 5% and more typically from 0.2% to 2%, by weight based on the total weight of the ink.

Other Additives

Other ingredients, additives, may be formulated into the inkjet ink, to the extent that such other ingredients do not interfere with the stability and jettability of the inkjet ink. This may be readily determined by routine experimentation by one skilled in the art.

Inclusion of sequestering (or chelating) agents such as ethylenediaminetetraacetic acid. (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediamineetetraacetic acid (CyDTA), diethylenetriamine-N,N,N',N",N"-pentaacetic acid. (DTPA), and glycoletherdiamine-N,N,N',N'-tetraacetic acid (GEDTA), and salts thereof, may be advantageous, for example, to eliminate deleterious effects of heavy metal impurities.

Polymers may be added to the ink to improve durability or other properties. The polymers can be soluble in the vehicle or in a dispersed form, and can be ionic or nonionic. Soluble polymers include linear homopolymers and copolymers or block polymers. They also can be structured polymers including graft or branched polymers, stars and dendrimers. The dispersed polymers may include, for example, latexes and hydrosols. The polymers may be made by any known process including, but not limited to, free radical, group transfer, ionic, condensation and other types of polymerization. They may be made by a solution, emulsion, or suspension polymerization process. Typical classes of polymer additives include anionic acrylic, styrene-acrylic and polyurethane polymer.

When a polymer is present, its level is typically between about 0.01% and about 3% by weight, based on the total weight of an ink. The upper limit is dictated by ink viscosity or other physical limitations.

Biocides may be used to inhibit growth of microorganisms.

Fillers, plasticizers, pigments, carbon black, silica sols, other polymer dispersions and the known leveling agents, wetting agents, antifoaming agents, stabilizers, and other additives known for the desired end use, may also be incorporated into the dispersions.

Ink Properties

Jet velocity, separation length of the droplets, drop size and stream stability are greatly affected by the surface tension and the viscosity of the ink. Pigmented ink jet inks typically have a surface tension in the range of about 20 $mN.m^{-1}$ to about 70 $mN.m^{-1}$, at 25° C. Viscosity can be as high as 30 mPa.s at 25° C., but is typically somewhat lower. The ink has physical properties compatible with a wide range of ejecting conditions, materials construction and the shape and size of the nozzle. The inks should have excellent storage stability for long periods so as not to clog to a significant extent in an ink jet apparatus. Further, the ink should not corrode g of the ink jet printing device it comes in contact with, and it should be essentially odorless and non-toxic.

Although not restricted to any particular viscosity range or printhead, the inks of the disclosure are particularly suited to lower viscosity applications. Thus the viscosity (at 25° C.) of the inks of this disclosure may be less than about 7 mPa.s, or less than about 5 mPa.s, and even more advantageously, less than about 3.5 mPa.s.

The following examples illustrate certain embodiments without, however, being limited thereto.

EXAMPLES

Particle Size Measurements

The particle size for the dispersions, pigments and the inks were determined by dynamic light scattering using a Microtrac® UPA 150 analyzer from Honeywell/Microtrac (Montgomeryville, Pa.).

This technique is based on the relationship between the velocity distribution of the particles and the particle size. Laser generated light is scattered from each particle and is Doppler shifted by the particle Brownian motion. The frequency difference between the shifted light and the unshifted light is amplified, digitalized and analyzed to derive the particle size distribution. Results are reported as D50 or D95.

Determination of Acid Number

In the present disclosure, Acid Number is expressed as milli-gram (mg) KOH per g of pigment (mg KOH required to titrate 1 g of pigment). To determine the Acid Number of a pigment, 50 g of a mixture of 80% of water and 20% of ethanol are added to 5 g of dry pigment, followed by sufficient amount of an aqueous KOH (11.7 N) to bring the pH to at least 11.0. The resulting slurry is titrated under agitation with aqueous HCl (0.5 M) while the pH is monitored and recorded. The pH trace thus obtained has two inflection points with the first inflection point (typically near pH 8) representing the amount of acid required to neutralize the excess KOH in the solution, and the second inflection point (typically near pH 5) representing the amount of acid required to neutralize both the excess KOH and the KOH that was consumed to neutralize the acid groups on the pigment. The number of mmol of HCl added between these two inflection points is equivalent to the number of mmol of acid on the pigment. Multiplying this number of mmol by the molecular weight of KOH and dividing by the original weight (g) of the pigment in the titrated sample provides the Acid Number for the pigment in a unit of mg KOH per gram of pigment.

Example 1

To a 1-gallon stainless horizontal mixer equipped with sigma blade kneading arms (Baker Perkins, Model AN4-2) were charged 125 g of finished grade PR 122 (Jet Magenta E02 supplied by Clariant), 912.5 g of micronized sodium chloride (supplied by Cargill), 187.5 g of diethylene glycol and 25 g of biphenyl dianhydride. The temperature of the heating jacket was set to 95° C., and the mixture was kneaded at for 12 h. The temperature was then raised to 175° C., and the mixture was kneaded for an additional 12 h.

In two separate 4 liter glass beakers, 550 g of the kneaded mixture was mixed into 2 liters of warm water and stirred with vigorous agitation. The pH of the diluted mixture was adjusted to less than 1.0, and the mixture was heated to 98° C. and held at that temperature for 2 h.

The pigment slurry from both beakers was filtered and washed with deionized water to remove salt and solvent until the conductivity of the filtrate reached 200 μS/cm to give a pigment press cake containing 29.0% of solids.

The treated press cake obtained above (206.9 g) was dispersed in 393.1 g of deionized water under high shear using a saw-tooth dispersion blade. The dispersion had a measured pH of 3.05. The pH was adjusted with 5N KOH solution to 8.01. After pH adjustment, the dispersion was processed through a high shear fluid processor (Microfluidics, Model M-110F) at 13,000 psi in a pass-to-pass mode for 10 passes.

After processing, the dispersion was evaluated and had the parameters below:

| Solids (%) | Viscosity (cP) | Conductivity (μS/cm) | pH | D50 (nm) | D95 (nm) | Accu-sizer | Acid Number |
|---|---|---|---|---|---|---|---|
| 9.45 | 1.45 | 1270 | 7.47 | 95.4 | 159.2 | 118.5 | 9.09 |

The dispersion was then purified by an ultrafiltration using approximately 8 volume dilutions of deionized water and concentrated to provide Dispersion 1 having 14.18% of solids with a final conductivity of 0.37 mS. The measured Acid number of Dispersion 1 was 2.15 mg KOH/g pigment.

Dispersion 1 was formulated into Ink 1 using ingredients listed below:

| Ingredients | Amount (g) |
|---|---|
| Dispersion 1 | 63.38 |
| 1,2-hexanediol | 4.00 |
| 2-pyrrolidone (99%) | 10.10 |
| Glycerol | 20.00 |
| Glycereth 26 | 10.00 |
| BYK 348 | 1.20 |
| Triethanolamine | 0.40 |
| DI water | 90.92 |

The physical properties of Ink 1 were measured and shown below:

| | |
|---|---|
| Surface Tension (Dyne/cm) | 24.98 |
| pH | 7.7 |
| Conductivity (μS/cm) | 197 |
| Viscosity (cP) | 2.86 |
| MV (nm) | 102 |
| D50 (nm) | 95 |
| D95 (nm) | 171 |
| Accusizer | 142 |

Ink 1 was printed from an Epson B-310 printer and produced prints with good color saturation and optical density.

Example 2

To a 1-gallon stainless horizontal mixer (Baker Perkins AN4-2) equipped with sigma blade kneading arms were charged 125 g of PR 269 (TRC 269-02 supplied by Trust Chemical), 912.5 g of micronized sodium chloride (supplied by Cargill), 187.5 g of diethylene glycol and 25 g of biphenyl dianhydride. The temperature of the heating jacket was set to 95° C., and the mixture was kneaded 6 h. The temperature was then raised to 175° C., and the mixture was kneaded for 6 h and 30 minutes. The temperature was lastly lowered to 70° C., and the mixture was kneaded for another 12 h.

In two separate 4 liter glass beakers, 550 g of the kneaded mixture was mixed into 2 liters of warm water and stirred with vigorous agitation. The pH of the diluted mixture was adjusted to less than 1.0, and the mixture was heated to 98° C. and held at that temperature for 2 h.

The pigment slurry from both beakers was filtered and washed with deionized water to remove salt and solvent until the conductivity of the filtrate reached 190 μS/cm to give a pigment press cake containing 35.0% of solids.

The treated press cake obtained above (285.7 g) was dispersed in 714.3 g of deionized water under high shear with a saw-tooth dispersion blade. This dispersion had a measured pH of 2.93. The pH was adjusted with 5N KOH solution to 8.84, and the dispersion was processed though a high shear fluid processor (Microfluidics model M-110F) at 13,000 psi in a pass-to-pass mode for passes.

After processing, the dispersion was evaluated and had the parameters below:

| Solids (%) | pH | D50 (nm) | D95 (nm) | Accusizer | Acid Number |
|---|---|---|---|---|---|
| 9.71 | 7.85 | 119.1 | 227.6 | 654 | 13.11 |

The dispersion was then purified by ultrafiltration using approximately 10 volume dilutions of deionized water and concentrated to provide Dispersion 2 having 13.62% of solids with a final conductivity of 220 μS/cm. The measured acid number after ultrafiltration was 6.87 mg KOH/g pigment.

Dispersion 2 was formulated into and Ink 2 using ingredients listed below.

| Ingredients | Amount (g) |
|---|---|
| Dispersion 2 | 82.6 |
| 1,2-hexanediol | 5.0 |
| 2-pyrrolidone (99%) | 12.6 |
| Glycerol | 25.0 |
| Glycereth 26 | 12.5 |
| BYK 348 | 1.5 |
| Triethanolamine | 0.5 |
| DI water | 110.3 |

The physical properties of Ink 2 were measured and shown below:

| | |
|---|---|
| Surface Tension (Dyne/cm) | 23.69 |
| pH | 8.42 |
| Conductivity (μS/cm) | 211 |
| Viscosity (cPs) | 2.96 |
| MV (nm) | 141 |
| D50 (nm) | 134 |
| D95 (nm) | 221 |

Ink 2 was printed from an Epson B-310 printer and produced prints with good color saturation and optical density.

Example 3

To a 1-gallon stainless horizontal mixer (Baker Perkins AN4-2) equipped with sigma blade kneading arms were charged 125 g of crude PR 122 (supplied by Trust Chemical), 912.5 g of micronized sodium chloride (supplied by Cargill), 187.5 g of diethylene glycol, and 25 g of biphenyl dianhydride. The temperature of the heating jacket was set to 95° C., and the mixture was kneaded for 14 h. The temperature was then raised to 150° C., and the mixture was kneaded for 7 hr. The temperature was lastly raised to 175° C., and the mixture was kneaded for 3 h and 30 minutes.

In two separate 4 liter glass beakers, 550 g of the kneaded mixture was mixed into 2 liters of warm water and stirred with vigorous agitation. The pH of the diluted mixture was adjusted to less than 1.0, and the mixture was heated to 98° C. and held at that temperature for 2 h.

The pigment slurry from both 4 beakers was filtered and washed with deionized water to remove salt and solvent until the conductivity of the filtrate reached 70 μS/cm to give a pigment press cake containing 29.2% of solids.

The treated press cake obtained above (376.7 g) was dispersed in 723.2 g of deionized water under high shear using a saw-tooth dispersion blade. The resulting dispersion had a measured pH of 3.18. The pH was adjusted with 5N KOH solution to 8.25. After adjustment of pH, the dispersion was processed though a high shear fluid processor (Microfluidics model M-110F) at 13,000 psi in a pass-to-pass mode for 10 passes.

The dispersion was evaluated and had the parameters below:

| Solids (%) | D50 (nm) | D95 (nm) | Accusizer |
|---|---|---|---|
| 9.80 | 96.0 | 152.0 | 176 |

The dispersion was then purified by ultrafiltration using approximately 12 volume dilutions of deionized water and concentrated to provide Dispersion 3 having 12.05% of with a final conductivity of 323 μS/cm. The measured Acid number after ultrafiltration was 6.37 mg KOH/g pigment.

Dispersion 3 was formulated into Ink 3 using ingredients listed below:

| Ingredients | Amount (g) |
|---|---|
| Dispersion 3 | 63.38 |
| 1,2-hexanediol | 4.00 |
| 2-pyrrolidone (99%) | 10.10 |
| Glycerol | 20.00 |
| Glycereth 26 | 10.00 |
| BYK 348 | 1.20 |
| Triethanolamine | 0.40 |
| DI water | 90.92 |

The physical properties of the ink were measured as shown below:

| | |
|---|---|
| Surface Tension (Dyne/cm) | 24.98 |
| pH | 7.7 |
| Conductivity (μS/cm) | 197 |
| Viscosity (cPs) | 2.86 |
| MV (nm) | 102 |
| D50 (nm) | 95 |
| D95 (nm) | 171 |

Ink 3 was printed from an Epson B-310 printer and produced prints with good color saturation and optical density.

Example 4

Preparation of an Acid-Amine Salt of Biphlenyitetracarboxylic Acid and Dodecamethylenediamine (BPDA/DDDA)

The BPDA/DDDA salt was prepared according to a procedure in the literature by Inoue et. al. in Macromolecules (1997), 30(7), 1921-1928. Biphenyl Dianhydride (36.62 g, 124 mmol) was dissolved in 670 g of a mixture of 90% isopropanol and 10% of water under reflux conditions. To the solution was added a solution of 20 g (99.8 mmol) of dodecane diamine (DDDA) in 150.7 g of isopropanol over a period of 2 h. The resulting mixture was heated at reflux for 1 h, and cooled overnight. After filtration and drying, the BPDA/DDDA salt was obtained as a white powder with parameters comparable to what was reported in the literature. DSC of the snow white powder exhibited an exothermic peak at 194° C. in the first heat cycle to 300° C., and the second heat cycle exhibited a Tg of 92.9° C. and a Tm of 210° C. The composition of the BPDA/DDDA salt was further confirmed by FTIR spectroscopy.

To a 1-gallon stainless horizontal mixer (Baker Perkins AN4-2) equipped with sigma blade kneading arms were charged 133.2 g of finished grade PR 122 (Jet Magenta E02 supplied by Clariant), 923.5 g of micronized sodium chloride (supplied by Cargill), 189.8 g of diethylene glycol, 4.0 g biphenyl dianhydride, and 14.6 g of BPDA-DDDA salt prepared above. The mixture was subjected to a series of kneading as the temperature of the heating jacket was raised. This included kneading at 70° C. for 6 h, at 95° C. for 7 h, at 125° C. for 1 hour, and at 150° C. for 45 minutes. The temperature was then raised to 175° C. and maintained for 1 h before the temperature was raised to 200° C. and maintained for 2 h and 15 minutes.

Two 4 liter glass beakers were each charged with 550 g of the kneaded mixture and 2 liters of warm water. The mixture was stirred with vigorous agitation, and the pH was adjusted to less than 1.0. The mixture was heated to 98° C. and held at that temperature for 2 h before cooling to ambient temperature to give a pigment slurry.

The pigment slurry from both beakers was filtered and washed with deionized water to remove salt and solvent until the conductivity of the filtrate reached 70 μS/cm whereby a treated pigment press cake containing 29.5% of solids was obtained.

The treated press cake obtained above (203.4 g) was dispersed in 396.6 g of deionized water under high shear with a saw-tooth dispersion blade. The dispersion had a measured pH of 3.57. The pH was adjusted with 5N KOH solution to 10.74. After pH adjustment, the dispersion was processed though a high shear fluid processor (Microfluidics, Model M-110F) at 13,000 psi in a pass-to-pass mode for 10 passes to provide Dispersion 4.

Dispersion 4 was evaluated and had the parameters below:

| Solids (%) | Viscosity (cP) | Contuctivity (µS/cm) | pH | D50 (nm) | D95 (nm) | Accu-sizer | Acid Number |
|---|---|---|---|---|---|---|---|
| 8.45 | 1.47 | 547 | 7.72 | 112.6 | 261.2 | 3632 | 8.51 |

Dispersion 4 was formulated into Ink 4 using ingredients shown below:

| Ingredients | Amount (g) |
|---|---|
| Dispersion 4 | 159.76 |
| 1,6-hexanediol | 15.00 |
| 1,2-hexanediol | 6.00 |
| 2-pyrrolidone (99%) | 15.15 |
| Glycerol | 30.00 |
| Glycerth 26 | 15.00 |
| Surfynol 465 | 1.50 |
| Proxel GXL | 0.60 |
| DI water | 56.99 |

The physical properties of Ink 4 were measured as shown below:

| | |
|---|---|
| Surface Tension (Dyne/cm) | 37.17 |
| pH | 6.72 |
| Conductivity (µS/cm) | 308 |
| Viscosity (cPs) | 4.39 |
| MV (nm) | 107 |
| D50 (nm) | 102 |
| D95 (nm) | 173 |
| Accusizer | 6677 |

Ink 4 was printed from an Epson B-310 printer and produced prints with good color saturation and optical density.

Example 5

To a 1-gallon stainless horizontal mixer (Baker Perkins AN4-2) equipped with sigma blade kneading arms were charged 125 g of PR 269 (supplied by Trust Chemical), 912.5 g of micronized sodium chloride (supplied by Cargill), 187.5 g of diethylene glycol and 25 g of diphenylsulfone dianhydride. The temperature of the heating jacket was set at 175° C., and the mixture was kneaded for 5 h and 20 minutes. The temperature was then lowered to 70° C., and the mixture was kneaded for an additional 18 h.

In two separate 4 liter glass beakers, 550 g of the kneaded mixture was mixed into 2 liters of warm water and stirred with vigorous agitation. The pH of the diluted mixture was adjusted to less than 1.0, and the mixture was heated to 98° C. and held at that temperature for 2 h.

The pigment slurry from both 4 liter beakers was filtered and washed with deionized water to remove salt and solvent until the conductivity of the filtrate reached 120 µS/cm to give a treated pigment press cake of containing 32.67% of solids.

The treated press cake obtained above (306.1 g) was dispersed in 693.9 g of deionized water under high shear with a saw-tooth dispersion blade. The dispersion had a measured pH of 2.97. The pH was adjusted with 5N KOH solution to 8.57. After pH adjustment, the dispersion was processed though a high shear fluid processor (Microfluidics model M-110F) at 13,000 psi in a pass-to-pass mode for 10 passes.

After processing the dispersion was evaluated for particle size as shown below.

| Solids (%) | D50 (nm) | D95 (nm) | Accusizer | Acid Number |
|---|---|---|---|---|
| 9.67 | 127.9 | 220.7 | 519 | 4.78 |

The dispersion was then purified by an ultrafiltration using approximately volume dilutions of deionized water and concentrated to provide Dispersion 5 having 9.04% of solids with a final conductivity of 128 µS/cm. The measured acid number of Dispersion 5 was 3.53 mg KOH/g pigment.

Dispersion 5 was formulated into Ink 5 using ingredients listed below.

| Ingredients | Amount (g) |
|---|---|
| Dispersion | 124.4 |
| 1,2-hexanediol | 5.0 |
| 2-pyrrolidone (99%) | 12.6 |
| Glycerol | 25.0 |
| Glycerth 26 | 12.5 |
| BYK 348 | 1.50 |
| Triethanolamine | 0.50 |
| DI water | 68.4 |

The physical properties of Ink 5 were measured as shown below:

| | |
|---|---|
| Surface Tension (Dyne/cm) | 23.87 |
| pH | 7.94 |
| Conductivity (µS/cm) | 177 |
| Viscosity (cPs) | 2.67 |
| MV (nm) | 145 |
| D50 (nm) | 136 |
| D95 (nm) | 229 |

ink 5 was printed from an Epson B-310 printer and produced prints with good color saturation and optical density.

Example 6

Control with No Additive

To a 1-gallon stainless horizontal mixer (Baker Perkins AN4-2) equipped with sigma blade kneading arms were charged 150.0 g of finished grade PR 122 (Jet Magenta E02 supplied by Clariant), 912.5 g of micronized sodium chloride (supplied by Cargill) and 187.5 g of diethylene glycol. The temperature of the heating jacket was set at 95° C., and the mixture was kneaded for 24 h.

In two separate 4 liter glass beakers, 550 g of the kneaded mixture was mixed into 2 liters of warm water and stirred with vigorous agitation. The pH of the diluted mixture was adjusted to less than 1.0, and the mixture was heated to 98° C. and held at that temperature for 2 h.

The pigment slurry thus obtained from both beakers was filtered and washed with deionized water to remove salt and solvent until the conductivity of the filtrate reached 30 µS/cm to give a pigment press cake containing 28.5% of solids.

The treated press cake obtained above (210.5 g) was dispersed in 389.5 g of deionized water under high shear with a saw-tooth dispersion blade. The dispersion had a measured pH of 3.47. The pH was adjusted with 5N KOH solution to 7.79. After pH adjustment, the dispersion was processed though a high shear fluid processor (Microfluidics model M-110F) at 13,000 psi in a pass-to-pass mode for 1 pass. This resulted in a viscous mud-like paste incompatible for further processing. Additional passes of high shear dispersing were aborted.

Example 7

Comparative

To a 1-gallon stainless horizontal mixer (Baker Perkins AN4-2) equipped with sigma blade kneading arms were charged 150.0 g of finished grade PR 122 (Jet Magenta E02 supplied by Clariant), 912.5 g of micronized sodium chloride (supplied by Cargill), 187.5 g of diethylene glycol and 25 g of 1,4,5,8-naphthalene tetracarboxylic acid dianhydride (available from TCI). The temperature of the heating jacket was set at 95° C., and the mixture was kneaded for 14 h. The temperature was then raised to 150° C., and the mixture was kneaded for 6 h and 50 minutes. The temperature was lastly raised to 175° C., and the mixture was kneaded for 3 h and 15 minutes.

In two separate 4 liter glass beakers, 550 g of the kneaded mixture was mixed into 2 liters of warm water and stirred with vigorous agitation. The pH of the diluted mixture was adjusted to less than 1.0, and the mixture was heated to 98° C. and held at that temperature for 2 h.

The pigment slurry thus obtained from both 4 liter beakers was filtered and washed with deionized water to remove salt and solvent until the conductivity of the filtrate reached 260 μS/cm to provide a pigment press cake containing 32.5% of solids.

A portion of the treated press cake (7.69 g) was dispersed in 17.31 g of deionized water under high shear with 20-30 mesh silica sand in a FlackTek DAC 150 Speed Mixer. The dispersion appeared thick and mud-like. The dispersion had a pH of 3.45. The pH was adjusted with 45% KOH solution to the acidic moieties, and the dispersion was further agitated. The dispersion remained thick and mud-like and was judged to not self disperse. No further processing was warranted.

Example 8

Comparative

To a 1-gallon stainless horizontal mixer (Baker Perkins AN4-2) equipped with sigma blade kneading arms were charged 150.0 g of finished grade PR 122 (Jet Magenta E02 supplied by Clariant), 912.5 g of micronized sodium chloride (supplied by Cargill), 187.5 g of diethylene glycol and 25 g of pyromellitic dianhydride. The temperature of the heating jacket was set at 95° C., and the mixture was kneaded for 6 h. The temperature was then raised to 175° C., and the mixture was kneaded for 6 h.

In two separate 4 liter glass beakers, 550 g of the kneaded mixture was mixed into 2 liters of warm water and stirred with vigorous agitation. The pH of the diluted mixture was adjusted to less than 1.0, and the mixture was heated to 98° C. and held t that temperature for 2 h.

The pigment slurry thus obtained from both 4 liter beakers was filtered and washed with deionized water to remove salt and solvent until the conductivity of the filtrate reached 80 μS/cm to provide a pigment press cake containing 30.3% of solids.

The treated press cake obtained above (7.42 g) was dispersed in 17.58 g of deionized water under high shear with 20-30 mesh silica sand in a FlackTek DAC 150 Speed Mixer. The dispersion appeared thick and mud-like. The dispersion had a pH of 3.72. The pH was adjusted with 45% KOH solution to neutralize acidic moieties, and the dispersion was further agitated. The dispersion remained thick and mud-like, and was judged to not self disperse. No further processing was warranted.

What is claimed is:

1. A process for making an aqueous pigment dispersion comprising the steps of:

(a) grinding a mixture comprising a pigment, one or a combination of coating agents, a grinding agent and a vehicle, wherein said grinding agent is insoluble in said vehicle and soluble in water, and said coating agents contain an ionizable moiety and have a structure of formula (I):

$$Q{-}[M^1]_n \qquad (I);$$

(b) washing with an aqueous medium to remove said grinding agent to form a press cake; and (c) adding an aqueous vehicle, adjusting the pH to ionize said ionizable moiety on said coating agents, and dispersing said press cake from step (b), in this order or any other workable orders, to form a dispersion;

wherein each $M^1$ is COOH or $NR^1R^2$, or two $M^1$ groups can be taken together with the carbon atoms they are bonded to form a cyclic anhydride, or $M^1$ is OH when Q is $C_6$-$C_{40}$ aryl; n is an integer from 2 to 6; each $R^1$ and $R^2$ is independently H, $C_1$-$C_9$ alkyl or $C_3$-$C_{12}$ cycloalkyl; and Q is $C_6$-$C_{40}$ alkyl, $C_6$-$C_{40}$ substituted alkyl, $C_6$-$C_{40}$ aryl or Q is —$Ar^1$—Y—$Ar^2$— and forms a molecule of formula (II):

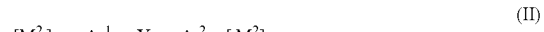

$$[M^2]_m{-}Ar^1{-}Y{-}Ar^2{-}[M^2]_m; \qquad (II)$$

wherein $Ar^1$ and $Ar^2$ are independently $C_6$-$C_{40}$ aryl; Y is $CR^3R^4$, S, S(O) or a straight bond; $R^3$ and $R^4$ are independently H or $C_1$-$C_9$ alkyl; each $M^2$ is COOH, or two $M^2$ groups can be taken together with the carbon atoms they are bonded to form a cyclic anhydride; and each m is independently an integer from 2 to 4.

2. The process of claim 1, further comprising a ultrafiltration step after step (c).

3. The process of claim 1, wherein said grinding agent is an inorganic salt.

4. The process of claim 3, wherein grinding takes place at temperature greater than 85° C.

5. The process of claim 4, wherein grinding initially takes place at temperature greater than 85° C. and subsequently at temperature greater than 135° C.

6. The process of claim 4, wherein grinding initially takes place at temperature greater than 160° C. and subsequently at temperature greater than 85° C.

7. The process of claim 4, wherein said aqueous medium in step (b) has a conductivity of less than 100 micro-Siemens per centimeter.

8. The process of claim 7, wherein $M^1$ is COOH and a base is used to adjust the pH.

9. The process of claim 7, wherein $M^1$ is $NR^1R^2$ and an acid is used to adjust the pH.

10. The process of claim 7, wherein two $M^1$ groups are taken together with the carbon atoms they are bonded to form a cyclic anhydride.

11. The process of claim 7, wherein said combination of coating agents comprises a first coating agent and a second coating agent, wherein said first coating agent has a structure of formula (I):

$$Q\!\left[M^1\right]_n \quad (I);$$

and said second coating agent has a structure of formula (II):

$$[M^2]_m\!-Ar^1-Y-Ar^2-\![M^2]_m; \quad (II)$$

wherein Q is $C_6$-$C_{40}$ alkyl, $C_6$-$C_{40}$ substituted alkyl or $C_6$-$C_{40}$ aryl; each $M^1$ is $NR^1R^2$; and each $M^2$ is COOH.

12. The process of claim 11, wherein the molar amount of said second coating agent is less than the molar amount of said first coating agent.

13. The process of claim 10, wherein Q is $C_6$-$C_{40}$ aryl.

14. The process of claim 13, wherein n is 4.

15. The process of claim 10, wherein Q is —$Ar^1$—Y—$Ar^2$—.

16. The process of claim 15, wherein $Ar^1$ and $Ar^2$ are phenyl.

17. The process of claim 16, wherein Y is a straight bond.

18. The process of claim 17, wherein each m is 2.

19. A process for making a readily dispersible press cake comprising the steps of:

(a) grinding a mixture comprising a pigment, one or a combination of coating agents, a grinding agent and a vehicle, wherein said grinding agent is insoluble in said vehicle and soluble in water, and said coating agents contain an ionizable moiety and have a structure of formula (I):

$$Q\!\left[M^1\right]_n \quad (I);$$

and (b) washing with an aqueous medium to remove said grinding agent to form a press cake;

wherein each $M^1$ is COOH or $NR^1R^2$, or two $M^1$ groups can be taken together with the carbon atoms they are bonded to form a cyclic anhydride, or $M^1$ is OH when Q is $C_6$-$C_{40}$ aryl; n is an integer from 2 to 6; each $R^1$ and $R^2$ is independently H, $C_1$-$C_9$ alkyl or $C_3$-$C_{12}$ cycloalkyl; and Q is $C_6$-$C_{40}$ alkyl, $C_6$-$C_{40}$ substituted alkyl, $C_6$-$C_{40}$ aryl or Q is —$Ar^1$—Y—$Ar^2$— and forms a molecule of formula (II):

$$[M^2]_m\!-Ar^1-Y-Ar^2-\![M^2]_m; \quad (II)$$

wherein $Ar^1$ and $Ar^2$ are independently $C_6$-$C_{40}$ aryl; Y is $CR^3R^4$, S, S(O) or a straight bond; $R^3$ and $R^4$ are independently h or $C_1$-$C_9$ alkyl; each $M^2$ is COOH, or two $M^2$ groups can be taken together with the carbon atoms they are bonded to form a cyclic anhydride; and each m is independently an integer from 2 to 4.

20. An ink-jet ink comprising an aqueous ink-jet vehicle and an aqueous pigment dispersion, where said aqueous pigment dispersion is prepared by a process comprising the steps of:

(a) grinding a mixture comprising a pigment, one or a combination of coating agents, a grinding agent and a vehicle, wherein said grinding agent is insoluble in said vehicle and soluble in water, and said coating agents contain an ionizable moiety and have a structure of formula (I):

$$Q\!\left[M^1\right]_n \quad (I);$$

(b) washing with an aqueous medium to remove said grinding agent to form a press cake; and (c) adding an aqueous vehicle, adjusting the pH to ionize said ionizable moiety on said coating agents, and dispersing said press cake from step (b), in this order or any other workable orders, to form a dispersion;

wherein each $M^1$ is COOH or $NR^1R^2$, or two $M^1$ groups can be taken together with the carbon atoms they are bonded to form a cyclic anhydride, or $M^1$ is OH when Q is $C_6$-$C_{40}$ aryl; n is an integer from 2 to 6; each $R^1$ and $R^2$ is independently H, $C_1$-$C_9$ alkyl or $C_3$-$C_{12}$ cycloalkyl; and Q is $C_6$-$C_{40}$ alkyl, $C_6$-$C_{40}$ substituted alkyl, $C_6$-$C_{40}$ aryl or Q is —$Ar^1$—Y—$Ar^2$— and forms a molecule of formula (II):

$$[M^2]_m\!-Ar^1-Y-Ar^2-\![M^2]_m; \quad (II)$$

wherein $Ar^1$ and $Ar^2$ are independently $C_6$-$C_{40}$ aryl; Y is $CR^3R^4$, S, S(O) or a straight bond; $R^3$ and $R^4$ are independently H or $C_1$-$C_9$ alkyl; each $M^2$ is COOH, or two $M^2$ groups can be taken together with the carbon atoms they are bonded to form a cyclic anhydride; and each m is independently an integer from 2 to 4.

* * * * *